Nov. 11, 1969     A. LENSKY     3,477,095
APPARATUS FOR MOLDING AND ASSEMBLING A CONTAINER
Filed Dec. 2, 1966     7 Sheets-Sheet 1
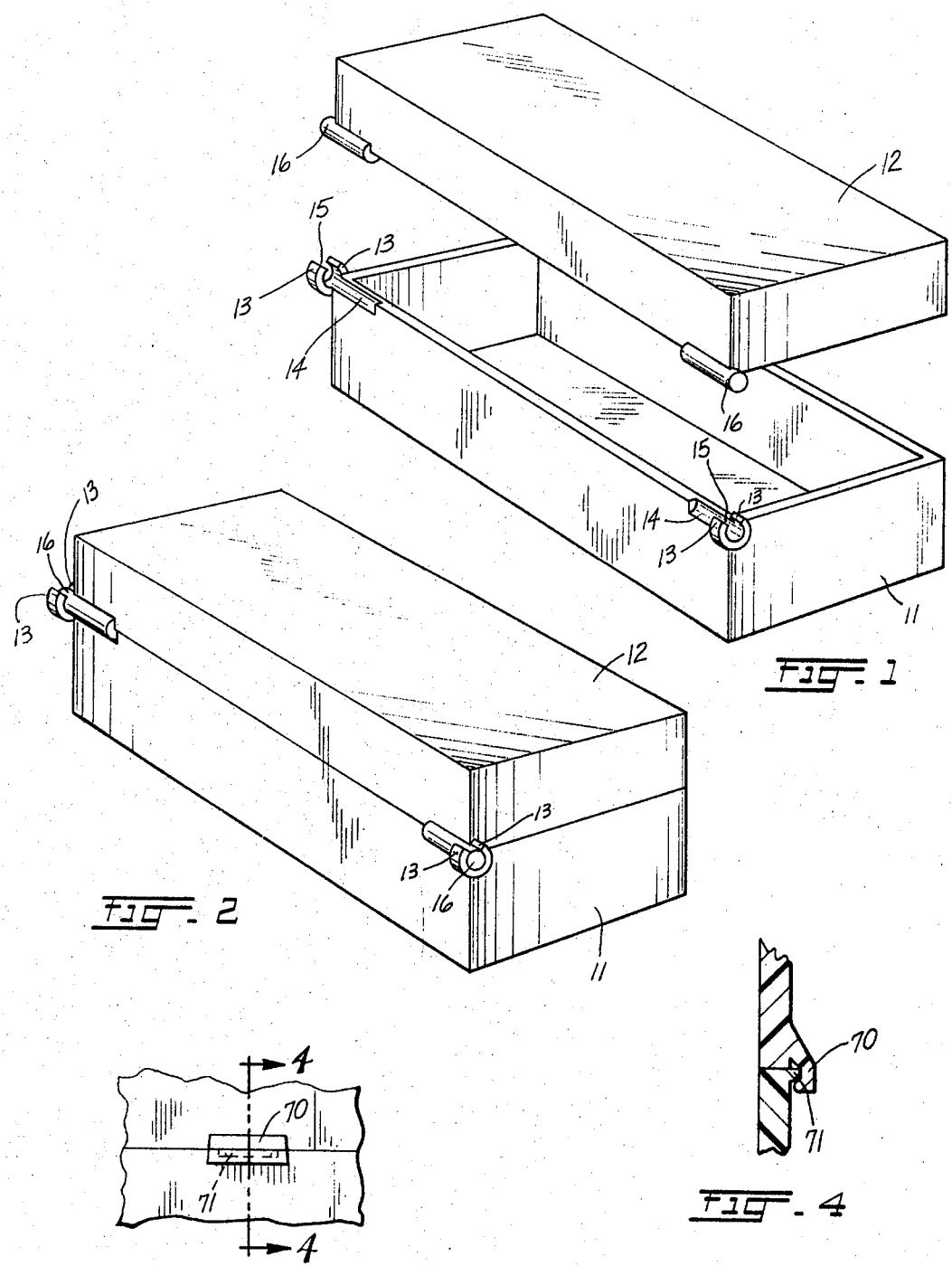
INVENTOR.
ALBERT LENSKY
BY J. Walter Barber
ATTORNEY

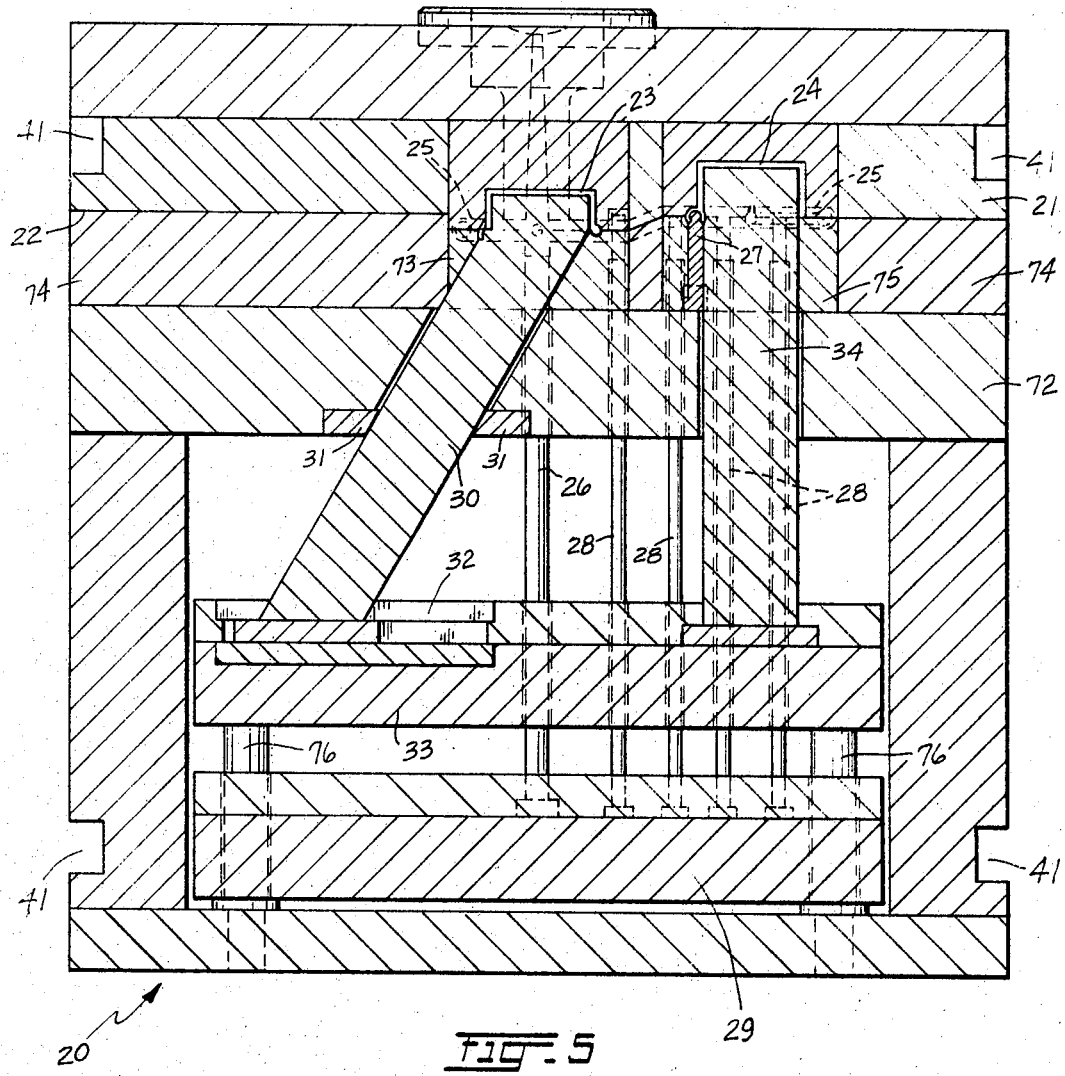

INVENTOR
ALBERT LENSKY

United States Patent Office 3,477,095
Patented Nov. 11, 1969

3,477,095
**APPARATUS FOR MOLDING AND
ASSEMBLING A CONTAINER**
Albert Lensky, New York, N.Y., assignor to Swingline
Inc., Long Island City, N.Y., a corporation of New
York
Filed Dec. 2, 1966, Ser. No. 598,762
Int. Cl. B29c 6/02
U.S. Cl. 18—2                                           2 Claims

ABSTRACT OF THE DISCLOSURE

A mold is shown which includes a number of pairs of spaced cavities which are laterally and vertically spaced from one another. Said cavities are within an openable cover so that the mold may be opened. A plate is provided which is vertically movable and carries a diagonally disposed core which is also slidably movable within the plate. A second core is rigidly attached to the plate. This structure permits the molding and assembly of the parts of the container.

---

The method of this disclosure involves molding the two (2) parts of the container in initially laterally and vertically spaced relationship. After the two (2) parts of the container are molded they are brought into adjacent lateral relationship and then moved into horizontally aligned relationship so as to assemble the same. The assembled structure is then ejected from the mold.

A container which may be produced by the apparatus of the instant invention may be briefly described as comprising a first member and a second member. One of the members has a pair of laterally disposed spaced arcuate ears thereupon which are made of resilient material and are provided with an open portion thereupon. A pair of laterally disposed spaced prong members are carried by the other member with each of the prong members of greater size than the size of the open portion and each being adapted to enter the open portion of one of the ears and be pivotally and embraceably retained therein.

The method of use of the apparatus of the instant invention may be briefly described as comprising the steps of molding a container having a first member and a second member pivotally connected thereto with one of the members having first fastening means thereupon and the other member having second engageable complementary means thereupon. The method is performed by simultaneously molding the first member and the second member in laterally spaced relationship with one another and thence bringing the members into registering relationship and engaging the respective fastening means.

The mold structure of this invention may be briefly described as comprising a plurality of forming elements which are laterally spaced from one another. Each of the respective forming elements are adapted to produce one part of a molded article. The molded article itself has complementary engageable fastening means on each of its parts. Means are provided for releasing the molded articles from the forming elements and for bringing the molded articles toward one another into adjacent relationship and to engage the complementary fastening means so as to produce a completely assembled molded article.

The invention will be further described by reference to the accompanying drawings which are made a part of this specification. In this connection, however, the reader is cautioned to note that the specific forms of this invention as shown in said drawings are for illustrative purposes and for purposes of example only. Various changes and modifications could obviously be made within the spirit and scope of this invention and would occur to those skilled in this art.

FIG. 1 is an exploded perspective view of one form of container that can be made in accordance with this invention.

FIG. 2 is a perspective view of the assembled container in closed position.

FIG. 3 is a detail plan view of the catch member of the container of this invention.

FIG. 4 is a sectional view taken along lines 4—4 of FIG. 3.

FIG. 5 is a cross-sectional view through the mold made in accordance with this invention showing the structure thereof. In this figure the mold is in closed position.

FIG. 11 is a detail cross-sectional view of the position of the complementary fastening means of the container while in the mold and just prior to assembly.

Figure 6:
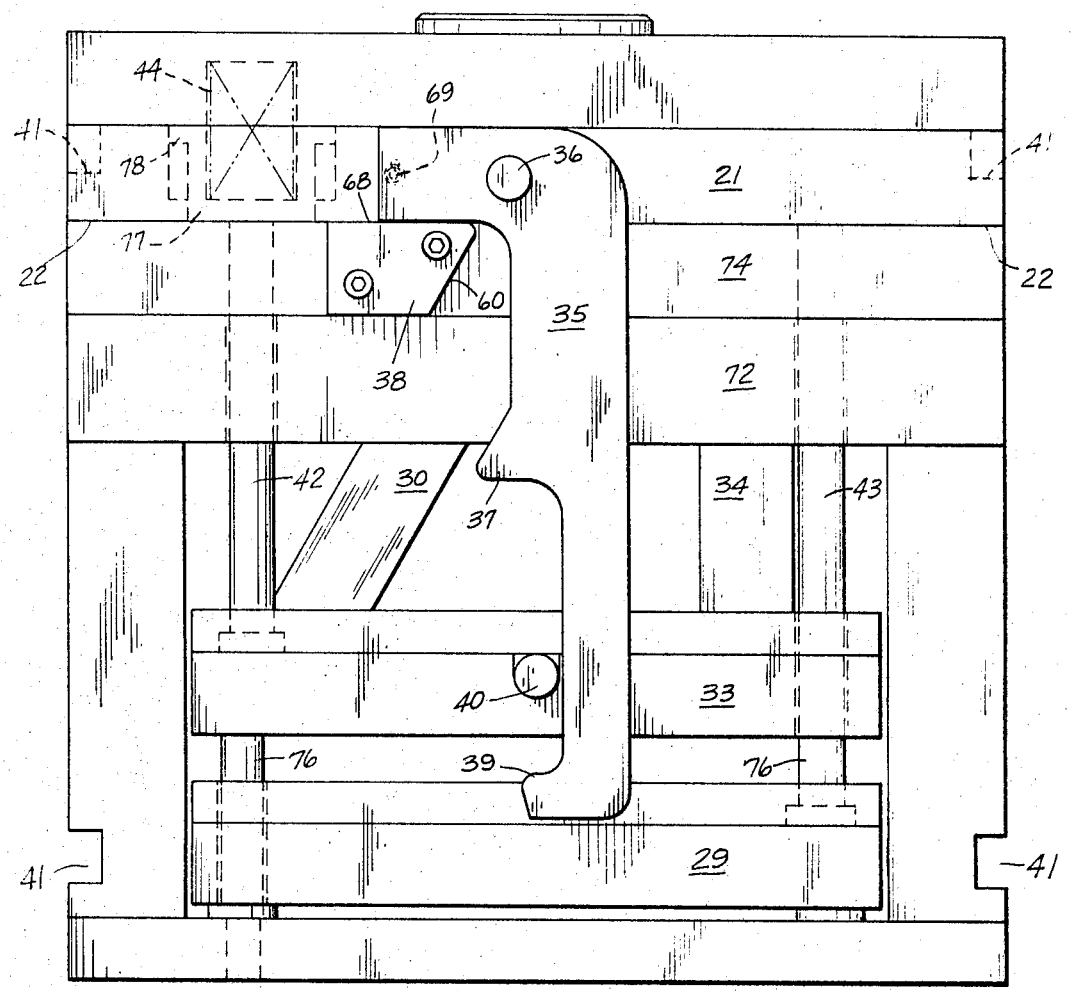
FIG. 6 is a side view of the mold shown in FIG. 5 and particularly showing the cam means which are used to control the cycle.

The container which can be molded by the apparatus of this invention is shown in FIGS. 1 through 4 of the drawings. The container comprises a first member 11 and a second member 12. Member 12 forms the cover of a box and member 11 the base of a box. Laterally disposed upon member 11 is a portion of a hinge structure which comprises a pair of spaced arcuate ears 13 which are made of resilient material. In the preferred modification of this invention, an additional recess 14 is provided adjacent ears 13 and extends inwardly. This prevents disassembly of the container by lateral sliding motion. Each of ears 13 is provided with an open portion 15 thereupon.

Member 12 bears a pair of laterally disposed prongs 16 which are of greater size than the size of portion 15. A catch mechanism 70 and 71 is also provided to secure the container in closed position.

In order to assemble the container described hereinabove, all that need be done is to place portion 16 in abutting relationship with space 15 and then bring pressure to bear upon the adjacent parts. This causes prong 16 to expand space 15 because of the resiliency of ears 13 but, when prongs 16 are sealed within recess 17 within ears 13, ears 13 then spring back to normal position and embraceably hold prongs 16 in position thus providing a very simple, rugged and inexpensive hinged container.

The mold structure for making the container set forth in FIGS. 1 through 4 is illustrated in FIGS. 5 through 11. The mold 20 of this invention consists of a cover portion 21 which is located above the parting line 22 of mold 20. Within mold 20 are a plurality of outer members or forming cavities 23–24. Cavity 23 is laterally spaced from cavity 24 and cavity 24 is slightly above cavity 23. The series of cavities 23–24 may be pluralized as shown in phantom in FIG. 10 and a plurality of channels 25 convey the liquid molding material (such as high impact styrene, polypropylene, polyethylene, or other moldable plastic) to the cavities 23 and 24. The mold also includes a sprue puller 26.

Adjacent cavity 24 is a "wiggle pin" 27 which is used to mold the ears 13.

A plurality of nock-out pins 28 of equivalent height are attached to knock-out plate 29.

Adjacent cavity 23 is a movable support member carrying a core element and hereafter called core 30. Core 30 is slidably guided within support 31 in support plate 72 and within support 73 in core plate 74. Core 30 is further movable laterally within recess 32 located within top nock-out plate 33. A second movable support member carrying a core element and hereafter called core 34 is also secured to top knock-out plate 33 but is guided vertically within support 75. Stop pins 76 are also provided.

Cover 21 is secured to actuator 35 (FIGS. 6 and 9) by means of pin 36. Actuator 35 bears a projection 37 which is abuttable against cam 38. Actuator 35 also bears an additional projection 39 which is abuttable against pin 40. Pin 40 is seecured to top knock-out plate 33. The entire mold is opened and closed by means of clamping slots 41 and mating clamps (not shown) which are secured to a movable platen and thus permit the mold to open and close.

A plurality of return pins 42 and 43 are also provided. A plurality of plungers 77 abut pins 42. Plungers 77 have shoulders 78 and are spring loaded by means of spring 44 for reasons that will become apparent as the description of this invention proceeds.

The operation of the method of this invention will now be explained.

The mold is initially in fully closed position, as shown in FIGS. 5 and 6. Plastic material is placed within the mold and fills cavities 23 and 24. The material is then cured as required by the material used, the curing time and processing depending upon the plastic employed. These processes are, of course, conventional and need not be further discussed here.

After the article is molded within the cavities 23 and 24, the movable platen actuates the mold through recesses 41 and mating clamps (not shown) and causes the remainder of the mold to move downwardly and the cover portion 21 to remain stationary. As cover 21 is moved away from core plate 74 actuator 35 moves upwardly since it is carried by the cover. As actuator 35 moves upwardly portion 39 contacts pin 40 and moves pin 40 upwardly. Pin 40 is, of course, attached to top knock-out plate 33 and therefore top knock-out plate 33 commences to move upwardly. Since core 30 is guided within members 31 and 73 but is slidably movable within recess 32 the upward movement of plate 33 causes core 30 to move laterally toward core 34. At the same time, of course, cores 30 and 34 are both moving upwardly.

Figure 7:
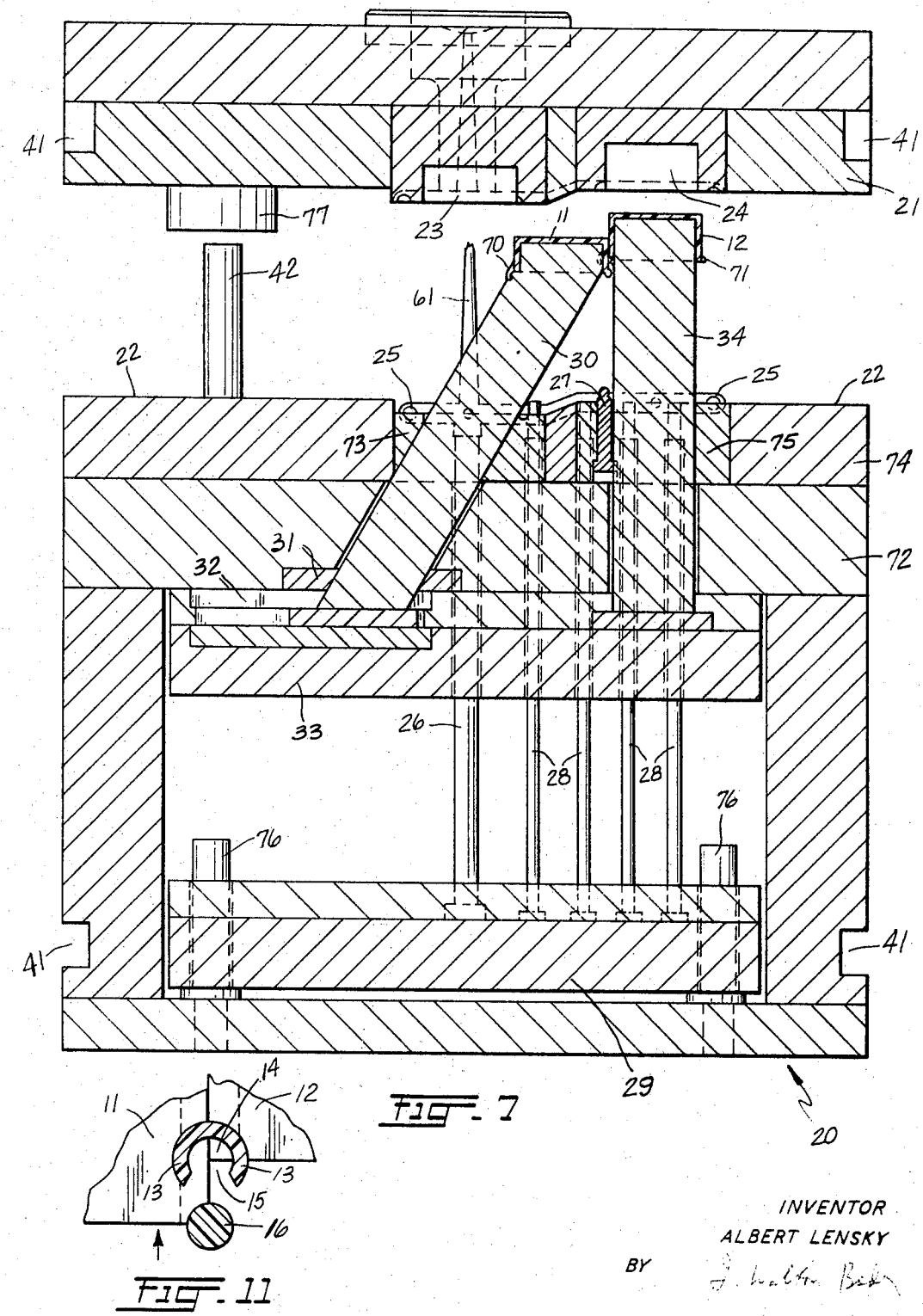
FIG. 7 is a view similar to that of FIG. 5 but showing the cover of the mold in open position and the molded articles in the position that they assume just prior to their assembly.
Figure 8:
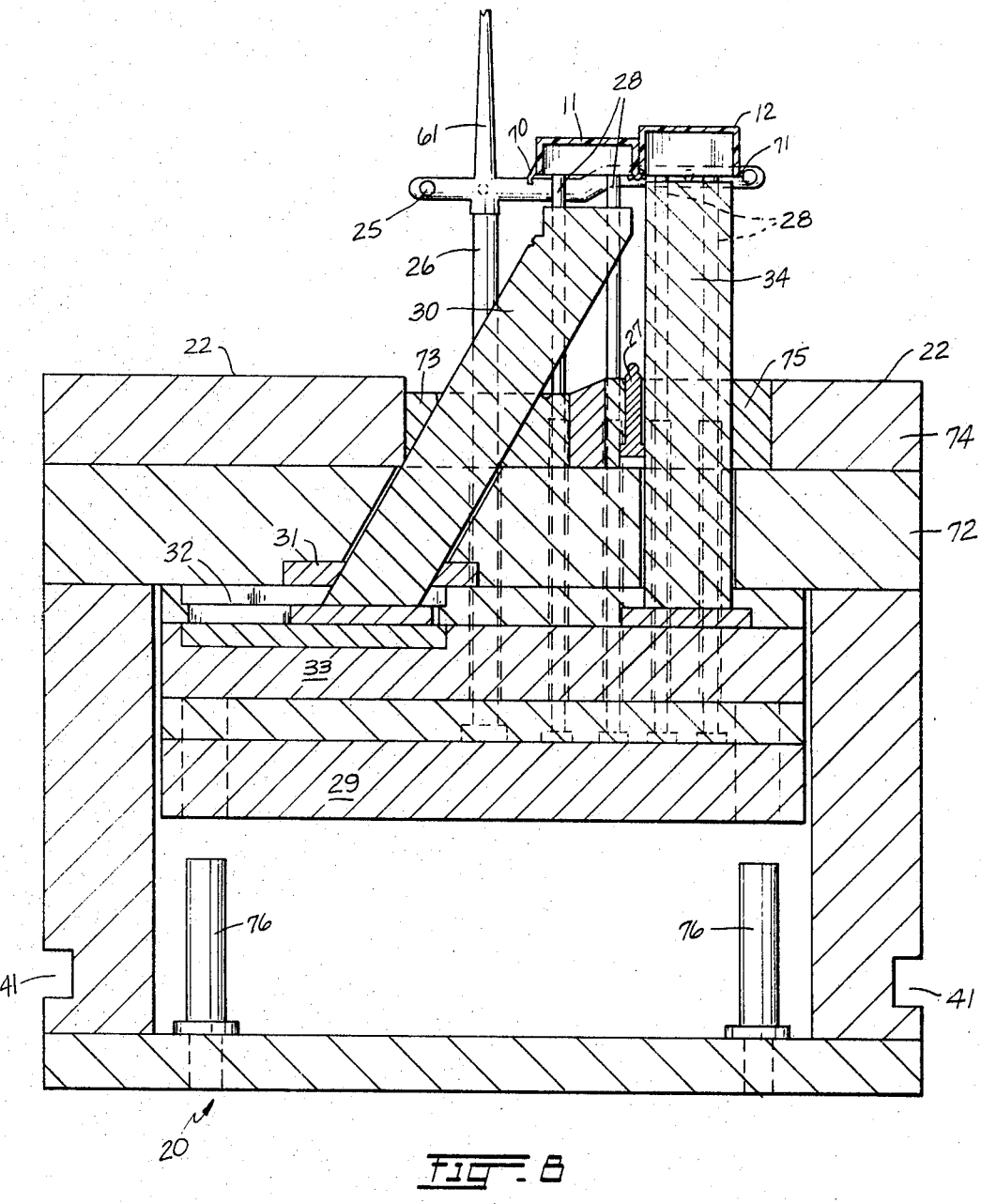
FIG. 8 is a view similar to that of FIG. 7 but showing the parts in the position that they assume as the parts of the container are assembled and ejected.

This condition continues until the position shown in FIG. 7 is reached and the base 11 of the container of this invention on core 34 is adjacent the cover 12 on core 30.

At this point cores 30 and 34 are both, in effect, stationary since core 30 has reached the limit of its lateral travel and plate 33 has reached the position shown in FIG. 7. At this point, actuator 35 has reached a position wherein projection 37 has contacted cam 38. Plate 29 now commences movement (FIG. 8) and causes pins 28 and sprue puller 26 to move upwardly with respect to cores 30 and 34. Since pins 28 are all of the same length they push member 12 into member 11 causing prongs 16 to enter recesses 17 located within ears 13. In addition, the former contact of projection 37 with the surface 60 of cam 38 causes actuator 35 to move outwardly away from pin 40. Pins 28 are then caused to move upwardly in a further direction and finally assume the configuration shown in FIG. 8. This causes members 11 and 12 to be stripped off the cores in completely assembled relationship and sprue 61 to be discarded.

Figure 9:
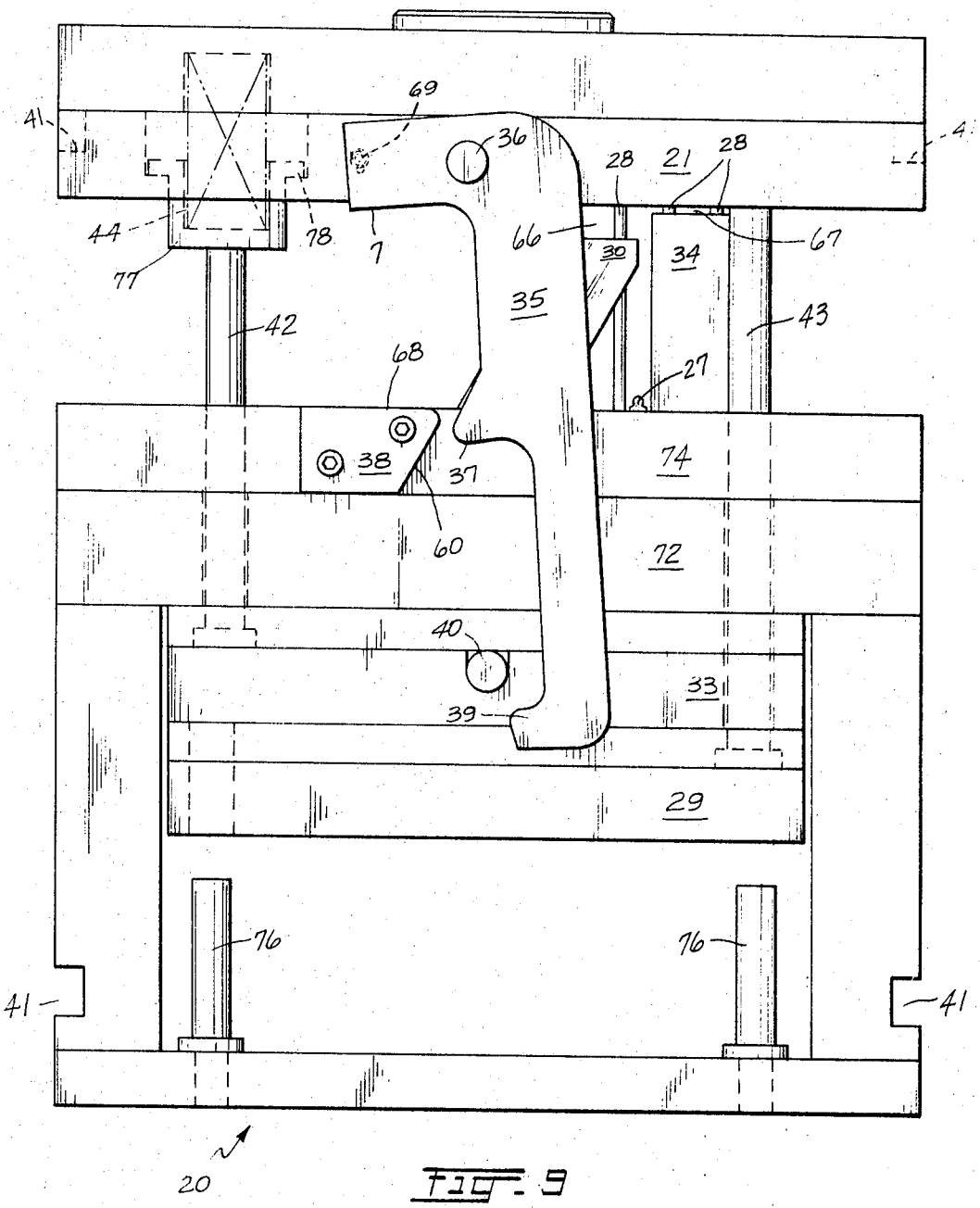
FIG. 9 is a view similar to that of FIG. 6 but showing the cam in the most extreme actuated position that it assumes and on the closing stroke of the mold.
Figure 10:
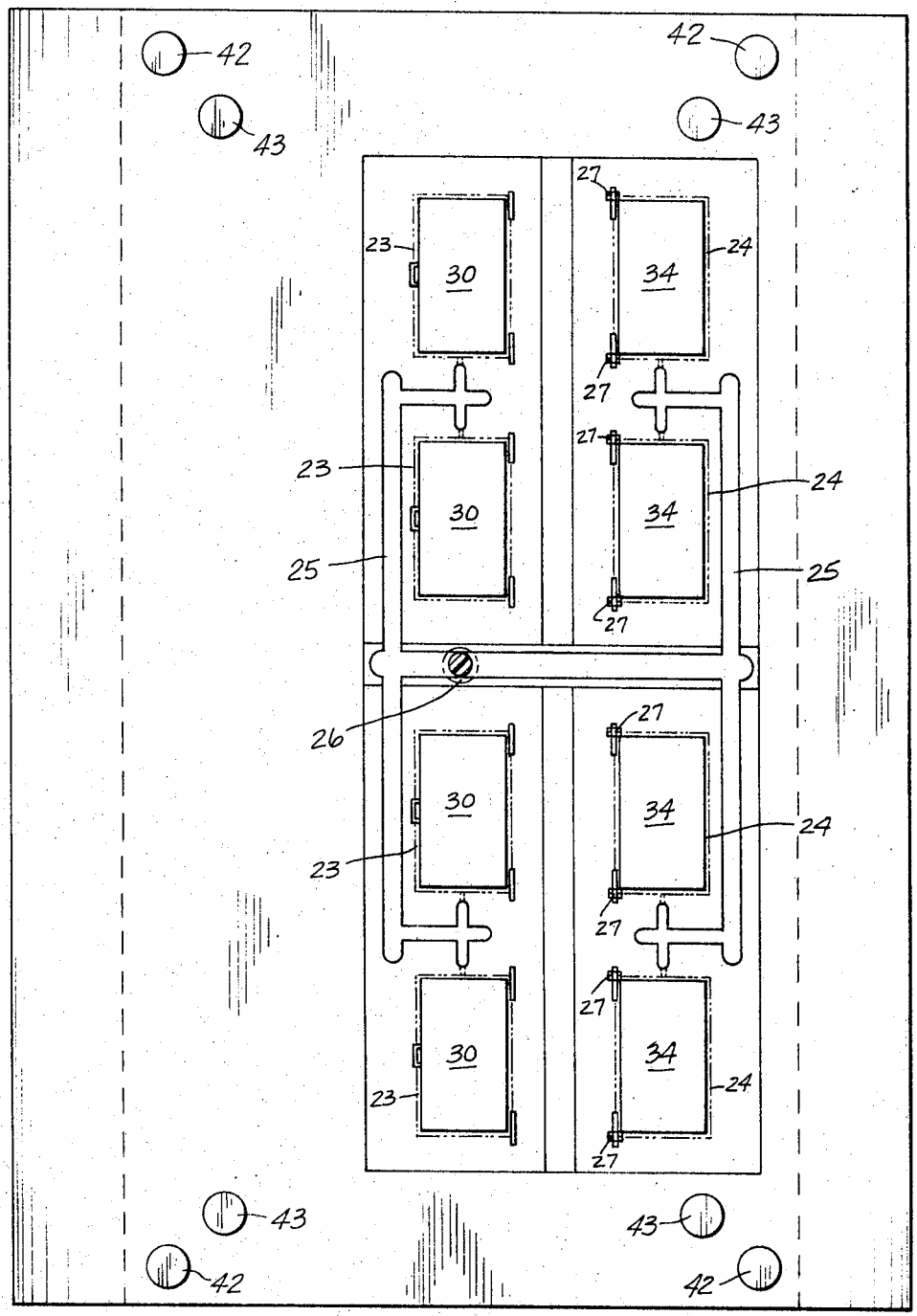
FIG. 10 is a plan view showing the position of adjacent mold cavities within the mold and the runner system.

After the mold has been opened it must be returned for another cycle. The mold parts move toward cover 21 as cover 21 bears against a spring 44 which is disposed within plunger 77 (FIG. 9). As a result, the closure of the mold will keep a distance between cover 21 and the top of core 30 (indicated by reference characters 66 and 67 in FIG. 9). As cover 21 continues to close portion 7 of actuator 35 contacts the top surface 68 of cam 38 and pushes the actuator back into its normal position. As the mold completely closes return pin 42 applies full pressure against spring loaded plunger 77 compressing spring 44 and thereby causes the mold to assume its completely closed position. The mold is now ready for another cycle.

In order to insure the proper positioning of actuator 35 it can be operatively connected to detent means 69 so that it will be retained either in full in or full out position.

The foregoing sets forth the manner in which the objects of this invention are achieved.

I claim:

1. A mold structure comprising a plurality of spaced movable support members each carrying a core element, each of said core elements being laterally spaced from one another, each of said respective core elements cooperating with a respective outer member to constitute a forming element adapted to produce one part of a molded article having complementary engageable fastening means thereupon, an openable cover overlying said core elements and supporting said outer members, one of said support members comprising a vertically and laterally movable member and adapted to bring said core members with the respective molded articles thereupon toward one another into adjacent relationship for engagement, cam means actuating said vertically and laterally movable member, and means for engaging said complementary fastening means and for releasing the assembled molded articles from said mold structure.

2. A mold structure as defined in claim 1 including a vertically movable plate member operatively connected with said vertically and laterally movable member, said cam means also actuating said plate member.

References Cited

UNITED STATES PATENTS

| 2,687,157 | 8/1954 | Cowan. |
| 2,778,533 | 1/1957 | Savory. |
| 2,875,472 | 3/1959 | Marcus _____ 249—68 |
| 3,013,308 | 12/1961 | Armour. |
| 3,336,654 | 8/1967 | Ryan _____ 29—235 X |

ROBERT F. WHITE, Primary Examiner

N. RUSHEFSKY, Assistant Examiner

U.S. Cl. X.R.

18—5, 42; 29—434, 450, 453; 249—64, 68; 264—294, 334